(No Model.)
J. DAHN.
CARRIAGE AXLE.
No. 307,181. Patented Oct. 28, 1884.
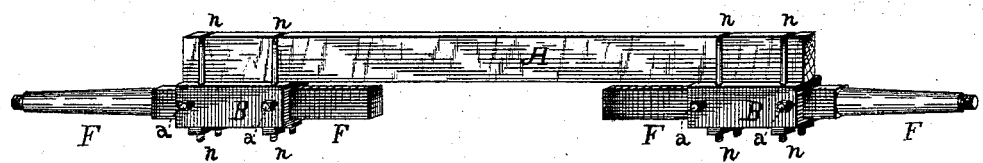
WITNESSES.
Chas. O. Richardson
Geo. H. Ketcham
John Dahn
INVENTOR.
C. M. Mallory
ATTORNEY.

UNITED STATES PATENT OFFICE.

JOHN DAHN, OF EAST TOLEDO, OHIO.

CARRIAGE-AXLE.

SPECIFICATION forming part of Letters Patent No. 307,181, dated October 28, 1884.

Application filed June 12, 1884. (No model.)

*To all whom it may concern:*

Be it known that I, JOHN DAHN, a citizen of the United States, residing at East Toledo, in the county of Lucas and State of Ohio, have invented a new and useful Adjustable or Variable Axle, of which the following is a specification.

My invention relates to improvements in adjustable axles for carts, wagons, farm implements, machinery, &c., in which movable sections or axle ends forming part of the main axle are arranged in such a manner that said axle may be varied in length.

The objects of my improvements are, first, to provide an adjustable axle combining simplicity, durability, and strength; second, to adapt garden-sprinklers, liquid-manure distributers, shovel-plows, cultivators, &c., to different-width rows. I attain these objects by the mechanism shown in the accompanying drawing, in which the adjustable axle is represented complete in one view, the different letters referring to different parts.

A is the main axle, which is made preferably of wood. B B are iron boxes through which the axle ends F F pass. The boxes B B are securely held to the main axle A by the U or clip bolts $n\ n$, provided with nuts or burrs, as shown. The set-screws $a\ a$ secure the axle ends F F at any required distance apart, thus adapting the ground-wheels, which run on said axle, to different-width rows.

Having thus fully described my invention, I claim as new and desire to secure by Letters Patent—

The boxes B B, provided with a round or square opening or hollow for receiving the spindle or axle ends F F, the set-screws $a\ a$, and the U or clamp bolts $n\ n$, all for the purpose specified, and substantially as shown.

JOHN DAHN.

Witnesses:
CHAS. O. RICHARDSON,
CHAS. MALLORY.